H. A. BENEDICT.
Corner-Iron for Billiard-Tables.
No. 221,503. Patented Nov. 11, 1879.
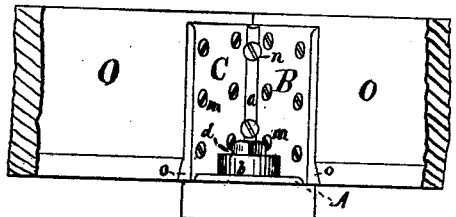
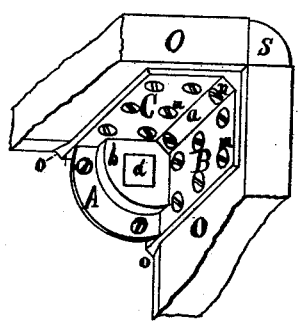
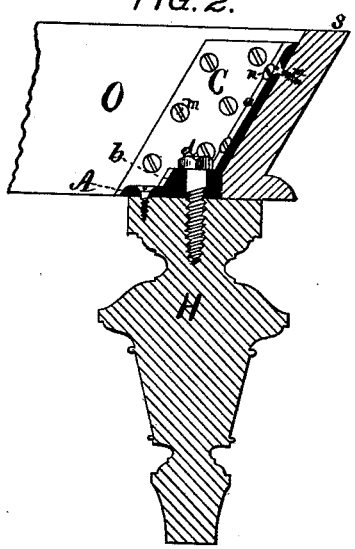
WITNESSES
M. McCarthy
N. Baxter
INVENTOR
Herman A. Benedict
By C. W. Smith
Attorney

UNITED STATES PATENT OFFICE.

HEMAN A. BENEDICT, OF SYRACUSE, NEW YORK, ASSIGNOR TO T. WILLIAM MEACHAM, OF SAME PLACE.

IMPROVEMENT IN CORNER-IRONS FOR BILLIARD-TABLES.

Specification forming part of Letters Patent No. 221,503, dated November 11, 1879; application filed May 1, 1879.

*To all whom it may concern:*

Be it known that I, HEMAN A. BENEDICT, of the city of Syracuse, in the county of Onondaga and State of New York, have invented a new and Improved Corner-Iron for Billiard-Table Frames; and I do hereby declare that the following is a full, clear, and exact description of the same, reference being had to the annexed drawings, in which—

Figure 1 represents a front elevation; Fig. 2, a longitudinal section, and Fig. 3 a top-plan view.

The object of my invention is to furnish a new and improved fastening to hold the extremities of the broad or side rails and the legs of a billiard-table frame firmly together in proper position, dispensing and doing away with all mortises or tenons, dowel-pins, or longitudinal or transverse bolts, which are now commonly used to join and hold the ends of these rails together.

It is designed to be used mostly upon bevel-frame tables, but may also be used in the construction of other styles, as will hereinafter appear.

It is constructed as follows: A is a quadrant-shaped base-piece, and upon both of the straight edges of this base are the sides B C, standing at any desired angle to the horizontal plane of the base, and meeting each other at a right angle at the back side. On the inner face of this angle it is filled up, so as to create a flat surface, a, as shown in the drawings.

Upon the upper surface of the base A, and fitting into the angles at the junction of the sides with the base, is the boss or hub b, which may be of any desired height, or quadrant-shaped, or otherwise, as preferred. Through this hub b a hole is bored perpendicular to the plane of the base A, of any desired size, to receive the bolt or wood-screw d.

m m are screw-holes through the sides B C, and n n are screw-holes through the flat surface in the angle where the sides meet. This angle is filled, so as to give a better surface or bearing for the screw-holes n n and countersink for the screw-heads.

The outer faces of the sides B C are made plain and smooth, except that at their lower ends, to fit the scarfed lower inner edges or faces of the rails, the sides are made thicker, as shown at o, so that the outer faces of the sides for a short distance will stand perpendicular to the plane of the base A.

This is the usual construction for bevel-frame tables, and may be changed, as deemed necessary, in other styles of tables.

In a square-frame table the sides B C will stand perpendicular to the base A, and the shoulder o may be dispensed with.

H is the leg of the table, and O O are the broad or side rails. In the top of the leg a hole is bored corresponding to that in the hub b. If to receive a bolt, it is bored clear down through the leg, while for a wood-screw only far enough to receive that.

s is a corner-piece, fitting into the space at the ends of the rails O O, which may be made of any shape on its outer surface, as desired, and is used oftentimes for decorative purposes, or to carry out and complete any particular design. It is used as follows: The wood-screw or bolt d is inserted and screwed up, thus fastening the leg in place. Then the broad rails O O are placed in position, with their lower edges resting upon the top of the leg, and screwed onto the sides B C, respectively, by screws inserted in the screw-holes m m. When the ends of these rails are made with a miter-joint no corner-piece is necessary; but when they are simply squared off then the corner-piece s is used, and is fastened in position by screws through the screw-holes n n.

Having thus described my device, what I claim as my invention, and desire to secure by Letters Patent, is—

1. The above-described corner-iron for billiard-table frames, having a quadrant-shaped base, A, sides B C, with screw-holes therein, hub b, with bolt-hole therein, and the shoulders o upon the outer faces of the sides B C, all constructed substantially as above described.

2. A corner-iron for billiard-tables, consisting of the base A, sides B C, their shoulders $o\ o$, and the hub $b$, in combination with the side rails, O O, and the leg H, to which parts the said corner-iron is secured, substantially as herein set forth.

3. A corner-iron for billiard-tables, consisting of the base A, sides B C, their shoulders $o\ o$, the hub $b$, and the flat meeting-surface of said sides, in combination with the angle-piece $s$, the side rails, O O, and the leg H, all constructed and united substantially as herein set forth.

HEMAN A. BENEDICT.

Witnesses:
C. W. SMITH,
H. BAXTER.